Patented June 1, 1943

2,320,866

UNITED STATES PATENT OFFICE 2,320,866

FLEXIBLE INSULATING MATERIAL

Lawrence R. Hill, Forest Hills, Pa., assignor to Westinghouse Electric & Manufacturing Company, East Pittsburgh, Pa., a corporation of Pennsylvania Application July 29, 1941, Serial No. 404,473

12 Claims. (Cl. 171—206)

This invention relates to insulating compositions and, more particularly, to flexible laminated insulating compositions for various types of electrical apparatus.

In the construction of electrical apparatus large amounts of laminated electrically insulating material of all kinds are required. In certain applications the electrically insulating material is applied by winding or shaping to some predetermined form in order to accommodate coils or other electrical conductors. In order to achieve flexibility it is common to employ laminated insulating materials bonded with a binder containing an evaporable solvent to soften the binder. Employing this latter type of material, the prepared flexible laminated insulating material must be carefully stored, as in airtight containers, and handled rapidly in order to prevent undesirable evaporation of the solvent, to avoid hardening of the material before application.

There is a demand in the electrical industry for an insulating material that is substantially permanently flexible in that it resists hardening with age whereby the insulating material retains its flexibility even after application to conductors, and while it is in use. Material of this type permits the distribution of stresses more effectively than a rigid insulating member would, and, furthermore, undesirable hardening effects are avoided. Cracking, curling, shrinkage, and similar phenomena associated with hardening would be avoided by the use of a material which resists hardening.

The object of the invention is to provide an insulating material which resists hardening with age and which is not materially affected by the range of temperatures of electrical apparatus in which such insulation may be used.

Another object of the invention is to provide for consolidating mica flakes with a bonding agent which resists hardening with age.

A further object of the invention is to provide for slot cell insulation for electro-dynamic apparatus comprising a plurality of materials for resisting abrasion and electrical stresses.

For a fuller understanding of the nature and objects of the invention, reference may be had to the following detailed description taken in connection with the accompanying drawing, in which.

Figure 1:
Figure 1 is an enlarged cross-sectional view of one form of the invention.

According to this invention, mica flake sheets and similar forms of mica are bonded by means of a resinous material which possesses good bonding properties without hardening to the extent that the composite material is brittle.

It has been found that polymerized isobutylene is a particularly satisfactory bonder for mica flakes in that it produces a composite laminated material which resists hardening with age. Polyisobutylene having an average molecular weight of from 3,000 to 20,000 has been found to be desirable for use with mica flakes to produce insulating material of the type herein indicated. For many purposes polyisobutylene of a molecular weight of 7,000 produces highly acceptable composite insulation.

In order to apply polyisobutylene to mica flakes it has been found that a solution of the polymer represents the most advantageous form for application. In applying polyisobutylene solutions to mica flakes in the conventional and well known mica bonding machines, the following solution has been used with success. Approximately 29 pounds of polyisobutylene of a molecular weight of 7,000 is heated to a temperature of 100° C. and cut into small pieces with a heated knife or other heated cutting utensil. The severed fragments of the polymer are introduced into a Banbury mixer and approximately 17 gallons of toluene heated to 60° C. is added to the resin fragments. The mixer is set into operation, and within a period of several hours, the particles of resin will have been put into solution. It is desirable to keep the mixer at a temperature of approximately 60° C. during this operation. The solution so prepared will have a solid content of approximately 20% and is substantially water-white and clear. The 20% solution may be used in mica laying machines with good results. For spraying a solution having a smaller proportion of solids may be prepared by adding more solvent.

While toluene has been mentioned as a suitable solvent for the polyisobutylene, numerous other solvents will obviously be equally suitable for this purpose. Benzene, xylene, hydrogenated petroleum fractions of a light molecular weight and mixtures of these are equally good for dissolving polyisobutylene.

In one mode of the invention, the solution is applied to a layer of mica flakes by dripping from sprinkling troughs in the conventional mica laying machine. After the layer of mica flakes has been thoroughly impregnated with the polyisobutylene solution, it may be coated with dry flakes on both sides to facilitate subsequent operations. The layer is heated to drive off the solvent and compressed while warm in order to firmly bind the flakes to each other. The bond is permanently adhesive. The sheet so prepared may be used at once for various purposes which are well known in the prior art relating to the application of bonded mica flakes as electrical insulation.

The electrical properties of polyisobutylene are quite closely similar to those of mica flakes and varying amounts of the binder may be combined with mica flakes to produce excellent electrical insulation. The combination with mica flakes has a power factor of 0.1% at 60 cycles when stressed as 300 volts per mil. These characteristics render the bonded mica useful for many insulation purposes.

An insulating material embodying mica flakes bonded with polyisobutylene of great utility is prepared in the following manner. Referring to Fig. 1 of the drawing, a composite laminated material is shown as including a base material 12, such as woven fiber glass, cambric, or other similar material bonded by a polyisobutylene layer 16 to a superposed layer of mica flakes. The use of a fabric woven fiber glass 12 is particularly advantageous for reasons which will be hereinafter set forth. In preparing the composite material 10, the following procedure has been found to be satisfactory. A layer of fabric 12, such as woven fiber glass, is laid down. A distribution of mica flakes 14 is deposited upon the fabric 12, and the polyisobutylene solution is sprayed or brushed on the layer of the mica flakes to form a bonding layer 16. Thereafter additional layers of mica flakes may be applied with further applications of the resin solution. The operation is continued until an insulating member of the desired thickness has been produced. A final layer of uncoated mica flakes may be applied for ease in handling, and the assembly is heated under presure to drive off the solvent and consolidate the whole. The material 10 prepared in this manner is quite flexible and may be kept in open air for long periods of time without any appreciable increase in hardness or substantial loss of flexibility. The material 10 of Fig. 1 may be severed into thin strips for use as a binding tape in binding coils and the like in electrical apparatus. It need not be kept in sealed containers as was required with prior art flexible tapes.

The fabric 12 may be treated with an impregnating composition in order to seal up its pores or to impart strengthening or fire-proofing characteristics thereto. In the case where the fabric 12 consists of woven glass fibers, particularly glass fibers of an average diameter of 0.00025 inches or less, polyvinyl resin compositions have been found to be particularly good treating agents. Specifically polyvinyl alcohol 50% to 70% hydrolyzed has been found to impart to woven glass fibers a remarkable resistance to tearing. It is well known that glass fibers alone have a great tensile strength. When combined into glass cloth, the resistance to tearing does not appear to be commensurate with the tensile strength of the fibers. There have been various explanations for this phenomenon, but it has been difficult to increase the tear strength of the material by any process heretofore practiced. It has been found that when solutions of polyvinyl alcohol are applied to glass cloth and the solvent removed that the film of polyvinyl alcohol on the cloth produces a remarkable increase in tear strength. Therefore a much stronger insulating material is produced by applying polyvinyl alcohol to woven glass fibers when used in forming the insulating member 10. In other cases, polyvinyl acetate has been found to have a pronounced adherence to glass fibers and the sealing effect of the resin upon the fibers reduces the moisture penetration and absorption thereof to a great degree.

Figure 2:
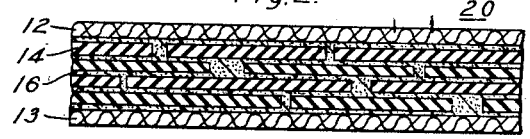
Fig. 2 is an enlarged cross-sectional view of a second form of the invention.

In Fig. 2 of the drawing there is illustrated a second embodiment of the invention in which a laminated insulating member 20 is formed of an upper and lower layer of fabric 12 and 13 with a plurality of mica flakes therebetween and a binder 16 comprising polyisobutylene bonding the whole. When woven glass fibers are employed for the fabric layers 12 and 13 in Fig. 2, a material of exceptional characteristics is produced, particularly when the glass fibers have been treated with polyvinyl alcohol or polyvinyl acetate as herein disclosed. The exterior layers of fabric 12 and 13 are substantially coextensive. Generally the insulating material 20 will be applied by winding or by other methods of introduction to apparatus whereby one fabric layer 12 is in contact with conductors or other portions of the electrical apparatus and the exposed outer fabric layer 13 protects the insulation from external damage. In this case the inner fabric layer 12 will resist abrasion and stresses in a manner that mica flakes by themselves would be unable to, while the outer fabric layer would serve as a protecting covering for resisting exterior dirt, impact, and other abuse.

Figure 3:
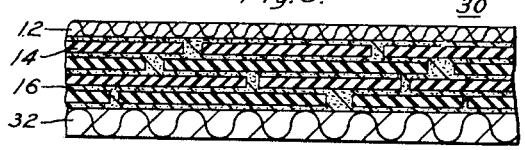
Fig. 3 is an enlarged cross-sectional view of a third form of the invention.

Referring to Fig. 3 of the drawing, there is illustrated a composite insulating member 30 consisting of a lower layer 32 of relatively heavy fabric, such as heavy woven glass fibers 32 and an exterior or upper layer of relatively thinner fabric 12 and in between a plurality of layers of mica flakes with polyisobutylene as a binder at 16 for the whole. The material 30 of Fig. 3 is highly desirable as a slot cell liner material. The heavy woven glass fiber layer 32 when impregnated with polyvinyl alcohol may be placed in contact with the slot walls of electro-dynamic cores, while the upper layer 12 is in contact with the conductors or windings in the slot. When the material 30 is intended to be used for slot cell insulation, it has been found that the treatment of the glass fabric 32 with polyvinyl alcohol or polyvinyl acetate will give a material which increases its resistance to abrasion by the relatively rough slot cell walls. The fabric 12, if made of glass fibers, is preferably varnished with a varnish such as tung oil type insulating varnishes, which will dry to a smooth, hard film. This smooth hard film upon the fabric 12 will permit an easy introduction of the windings into the liner and is desirable on this account.

Figure 4:
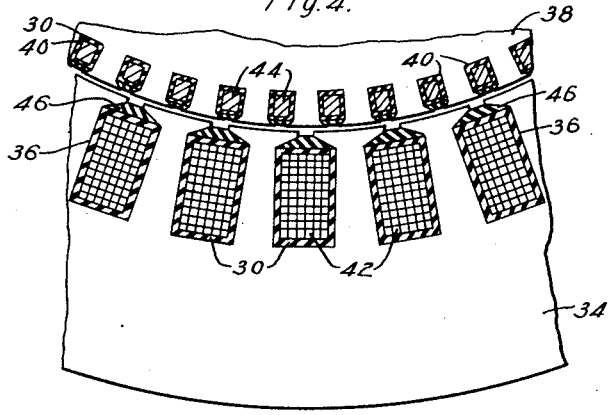
Fig. 4 is a fragmentary view partly in section of an application of Fig. 3.

The use of the material 30 is illustrated in greater detail in Fig. 4. The stator 34 of an electrodynamic machine such as a motor consists of a plurality of laminations, which have been stacked, provided with slots 36. The rotor of the machine consists of a plurality of laminations 38 which have been stacked into an assembly and have slots 40 formed therein. The cells formed by the slots 36 and 40 contain the windings 42 and 44, respectively. The slot cell insulation 30 as formed in Fig. 3 is suitably shaped to fit the walls 36 and 40 of the slots. The windings 42 and 44 are introduced into the lined slots, and the insulation is shaped to completely enclose the windings. Thereafter a slot stick 46 is placed in each slot to retain the whole in place.

In the compositions shown in Figs. 1, 2, and 3 the use of the polyisobutylene as a binder results in a material which is extremely flexible and resists age-hardening. The composite insulating material is highly moisture proof and will maintain good electrical insulation under humid conditions. Prior art slot cell materials were greatly deficient in resistance to humid conditions, since paper has been commonly regarded as a necessary component of slot cell liners heretofore.

Polyisobutylene binder for composite laminated insulation does not dissolve in most combination varnish solvents, such, for example, as toluol-alcohol mixtures, and the insulation may be used with safety on apparatus that is to be impregnated with varnish thereafter. Normal high temperatures will not soften the polyisobutylene to an appreciable extent and throw-out of the resin will not occur. In cases where excessively high temperatures are met, the polyisobutylene does not carbonize, and thereby result in a path for electrical short-circuits, but it simply evaporates at temperatures about 160° C. with substantially no residue. Polyisobutylene is particularly good as a binder for mica flakes due to its electrical and physical properties. The power factor of polyisobutylene, for example, is 0.05%. Polyisobutylene adheres tenaciously to mica flakes and maintains a permanent bond therewith. For these reasons a combination of mica flakes and polyisobutylene results in a highly satisfactory laminated material. The composite material may be molded, cut, and both mechanically and manually shaped to any desired form, as called for by engineering requirements.

While the use of polyisobutylene alone produces preferred bonding results, related monolefins and diolefins such as isoprene and butadiene and the like may be added after polymerization to polyisobutylene to impart variations in properties. In this manner the viscosity, hardness and other properties of the binder may be changed to meet requirements.

Since certain changes in carrying out the above processes and certain modifications in the articles which embody the invention may be made without departing from its scope, it is intended that all matter contained in the above description or shown in the accompanying drawing shall be interpreted as illustrative and not in a limiting sense.

I claim as my invention:

1. Insulating material, comprising in combination, mica flakes, a base material for supporting the mica flakes, and a bonding agent which resists age hardening composed of polyisobutylene to bind the base material and the mica flakes into a whole.

2. Insulating material, comprising in combination, mica flakes, a fabric of glass fibers of an average diameter of 0.00025 inch or less for supporting the mica flakes, and a bonding agent which resists age hardening composed of polyisobutylene to bind the fabric of glass fibers and the mica flakes into a whole.

3. Flexible insulating material, comprising, in combination, a base comprising a fabric of glass fibers, a coating of resin on the fabric, a distribution of mica flakes on the coated fabric, and a bonding agent composed of polyisobutylene applied to the mica flakes to bind the fabric and and the mica flakes into a unitary material that resists age hardening, is highly moisture resistant and does not appreciably carbonize at elevated temperatures.

4. Flexible insulating material, comprising, in combination, a base comprising a fabric of glass fibers, a coating from the group consisting of polyvinyl alcohol and polyvinyl acetate to increase tear resistance on the fabric, a distribution of mica flakes on the coated fabric, and a bonding agent composed of polyisobutylene applied to the mica flakes to bind the fabric and the mica flakes into a unitary material that is resistant to age hardening, highly moisture resistant and does not appreciably carbonize at elevated temperatures.

5. Flexible insulating material, comprising, in combination, a base comprising a fabric of glass fibers, a coating of resin on the fabric, a distribution of mica flakes on the coated fabric, and a bonding agent composed of polyisobutylene of an average molecular weight of from 3,000 to 20,000 applied to the mica flakes to bind the fabric and the mica flakes into a unitary material that is resistant to age hardening, highly moisture resistant and does not appreciably carbonize at elevated temperatures.

6. A flexible electrically insulating material, comprising, in combination, a fabric base, flakes of mica upon the fabric base and superposed upon each other, a fabric covering substantially coextensive with the fabric base over the mica flakes, and a binder composed of polyisobutylene having an average molecular weight of 3,000 to 20,000 for bonding the whole.

7. A flexible electrically insulating material, comprising, in combination, a fabric base, flakes of mica upon the fabric base and superposed upon each other, a fabric covering substantially coextensive with the fabric base over the mica flakes, the fabric base and fabric covering comprising woven glass fibers, and a binder composed of polyisobutylene having an average molecular weight of 3,000 to 20,000 for bonding the whole.

8. A flexible electrically insulating laminated material, comprising, in combination, a fabric base of woven glass fibers, a polyvinyl resin coating upon the fabric base, flakes of mica superposed on each other upon the fabric base, a fabric covering substantially coextensive with the fabric base disposed over the mica flakes, the fabric covering being of woven glass fibers, a coating of resin on the fabric covering, and a binder composed of polyisobutylene having an average molecular weight of 3,000 to 20,000 for bonding the whole.

9. In a dynamo-electric machine having a magnetic core provided with slots and a winding in the slots, a flexible, moisture resisting insulating material in the slots intermediate the windings and the core to protect the windings, the insulating material comprising a ply of fabric composed of glass fibers, a layer of mica flakes on the ply of fabric and a bonding agent composed of polyisobutylene of an average molecular weight of from 3,000 to 20,000 binding the mica flakes and glass fabric.

10. In a dynamo-electric machine having a magnetic core provided with slots and a winding in the slots, a flexible, moisture resisting insulating material in the slots intermediate the windings and the core to protect the windings, the insulating material composed of a first ply of fabric woven from glass fibers in contact with the slot walls, a layer of mica flakes on the first ply of fabric, a second ply of fabric over the mica flakes in contact with the winding and a binder composed of polyisobutylene having an average molecular weight of 3,000 to 20,000 for bonding the plys of glass fabric and the mica flakes.

11. In a dynamo-electric machine having a magnetic core provided with slots and a winding in the slots, a flexible, moisture resisting insulating material in the slots intermediate the windings and the core to protect the windings, the insulating material composed of a first ply of fabric woven from glass fibers in contact with the slot walls, the first ply of fabric being impregnated with a resin selected from the group consisting of polyvinyl alcohol and polyvinyl acetate to provide for improved tear resistance, a layer of mica flakes on the first ply of fabric, a second ply of fabric over the mica flakes in contact with the winding and a binder composed of polyisobutylene having an average molecular weight of 3,000 to 20,000 for bonding the plys of glass fabric and the mica flakes.

12. A laminated electrically insulating material composed of mica flakes and a binder therefor composed of polyisobutylene of an average molecular weight of from 3,000 to 20,000, the laminated product being characterized by flexibility, resistance to age hardening and low power factor.

LAWRENCE R. HILL.